United States Patent
Yan et al.

(10) Patent No.: US 10,676,012 B2
(45) Date of Patent: Jun. 9, 2020

(54) UNPOWERED STOP MECHANISM

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Yan-Fang Yan, Shenzhen (CN); Jing-Wei Liu, Shenzhen (CN); Shun-Ming Wang, Shenzhen (CN); Zhen-Ke Zhang, Shenzhen (CN); Shi-Li Zhang, Shenzhen (CN); Zheng-Hu Jiang, Shenzhen (CN); Ri-Qing Chen, Shenzhen (CN); Xue-Feng Che, Shenzhen (CN); Xi-Hang Li, Shenzhen (CN); Eddy Liu, New Taipei (TW)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 62 days.

(21) Appl. No.: 16/045,482

(22) Filed: Jul. 25, 2018

(65) Prior Publication Data
US 2019/0351813 A1 Nov. 21, 2019

(30) Foreign Application Priority Data
May 18, 2018 (CN) .......................... 2018 1 0482652

(51) Int. Cl.
*B60P 7/15* (2006.01)

(52) U.S. Cl.
CPC .............. *B60P 7/15* (2013.01); *Y10S 901/01* (2013.01)

(58) Field of Classification Search
CPC .................................. B60P 7/15; Y10S 901/01
See application file for complete search history.

(56) References Cited

FOREIGN PATENT DOCUMENTS

| CN | 108973556 A | * | 12/2018 |
| CN | 109018072 A | * | 12/2018 |
| JP | 2920884 B2 | * | 7/1999 |
| JP | 2008063117 A | * | 3/2008 |

* cited by examiner

*Primary Examiner* — Hilary L Gutman
(74) *Attorney, Agent, or Firm* — ScienBiziP, P.C.

(57) ABSTRACT

An unpowered stop mechanism includes a mounting seat, a driving member, and a stop assembly. The stop assembly is located on the mounting seat and oppositely positioned to the driving member. The stop assembly includes a guide member, a stop member, and a hinge arm. The stop member is received within a guide slot defined in the guide member. The hinge arm is pivotably coupled to the guide member. The hinge arm protrudes from the guide member and is oppositely positioned to the driving member. The driving member drives the hinge arm to drive the stop member to retract within the guide slot. Then the driving member is moved to be spaced from the hinge arm, the stop member is driven by a resilient member received within the guide slot to protrude out of the guide slot.

10 Claims, 4 Drawing Sheets

UNPOWERED STOP MECHANISM

FIELD

The subject matter herein generally relates to an unpowered stop mechanism for use on a transport frame.

BACKGROUND

Auto-guided vehicles are becoming in common use for transporting workpieces. The workpieces need to be secured in place on the auto-guided vehicles to prevent the workpieces from falling off.

Therefore, there is room for improvement within the art.

BRIEF DESCRIPTION OF THE DRAWINGS

Implementations of the present disclosure will now be described, by way of example only, with reference to the attached figures.

DETAILED DESCRIPTION

Figure 1:
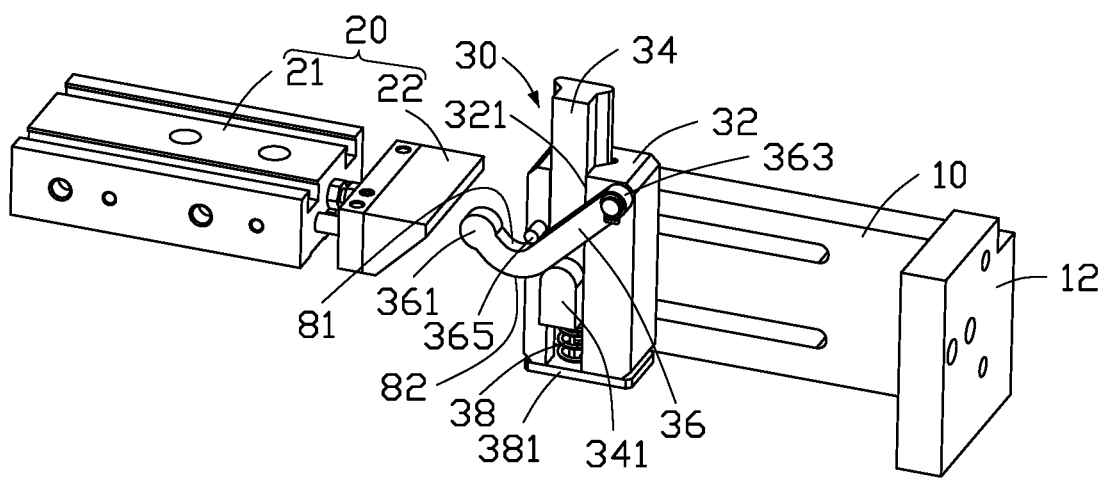
FIG. 1 is an isometric view of an embodiment of an unpowered stop mechanism in accordance with an embodiment of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 illustrates an embodiment of an unpowered stop mechanism 100 including a mounting seat 10, a driving member 20, and a stop assembly 30. By "unpowered", it is meant that the unpowered stop mechanism 100 is not electrically coupled to any power source. The stop assembly 30 is located on the mounting seat 10 and spaced from the driving member 20. The stop assembly 30 includes a guide member 32, a stop member 34, and a hinge arm 36. The guide member 32 defines a guide slot 321 to receive the stop member 34 therein. The hinge arm 36 is pivotably coupled to the guide member 32. The hinge arm 36 protrudes from the guide member 32 and is spaced from the driving member 20. The driving member 20 drives the hinge arm 36 to cause the stop member 34 to retract within the guide slot 321. When the driving member 20 is moved to be spaced from the hinge arm 36, the stop member 34 is driven by a resilient member 38 within the guide slot 321 to protrude out of the guide slot 321. The mounting seat 10 includes a mounting end 12. The stop assembly 30 is located at an end of the mounting seat 10 spaced from the mounting end 12. The stop assembly 30 is oriented substantially perpendicularly to the mounting seat 10 so that the stop member 34 is located on a lateral side of the mounting seat 10. The hinge arm 36 includes a protruding end 361 protruding from the end of the mounting seat 10 spaced from the mounting end 12. The protruding end 361 is spaced from the driving member 20.

The guide slot 321 and the hinge arm 36 are located on an outer surface of the guide member 32. An upper portion of the guide slot 321 receives the stop member 34 therein, and a lower portion of the guide slot 321 receives the resilient member 38. The resilient member 38 resists against the stop member 34, and the hinge arm 36 spans across the guide slot 321. In other words, the guide member 32 of the stop assembly 30 is located at the end of the mounting seat 10 spaced from the mounting end 12. The guide slot 321 is defined in the outer surface of the guide member 32, and the hinge arm 36 is located on the outer surface of the guide member 32. The guide slot 321 extends from the outer surface of the guide member 32 to an interior of the guide member 32. The hinge arm 36 is pivotably coupled to the outer surface of the guide member 32 and spans across the guide slot 321 so that the protruding end 361 protrudes from the mounting seat 10. Additionally, a base plate 381 is located at a bottom end of the guide slot 321 to cause the stop member 34 resisted against by the resilient member 38 to protrude out of a top end of the guide slot 321. In at least one embodiment, the guide slot 321 is a dovetail slot, and the stop member 34 is a dovetail-shaped sliding block. The stop member 34 is slidably received within the guide slot 321. The stop member 34 includes a protruding block 341 located at the bottom end of the guide slot 321. The protruding block 341 protrudes from the outer surface of the guide member 32 and abuts on the hinge arm 36. Therefore, the stop member 34 is received in one end of the guide slot 321, and the resilient member 38 is received in another end of the guide slot 321. The base plate 381 causes the resilient member 38 to be in a compressed state and resist against the stop member 34.

The hinge arm 36 includes a hinge end 363 pivotably coupled at an end of the guide slot 321 receiving the stop member 34. The hinge arm 36 includes a first edge 81 and a second edge 82 opposite to the first edge 81. The second edge 82 of the hinge arm 36 abuts on the protruding block 341 of the stop member 34. A limiting pin 365 protruding from an outer surface of the guide member 32 is located at the first edge 81 of the hinge arm 36. The limiting pin 365 is located at an end of the guide slot 321 spaced from the hinge end 363. The limiting pin 365 limits movement of the hinge arm 36. In detail, the hinge arm 36 is pivotably coupled to the outer surface of the guide member 32 by the hinge end 363. The hinge arm 36 spans across the guide slot 321. Thus, the protruding block 341 protruding from the outer surface of the guide member 32 abuts on the second edge 82 of the hinge arm 36. Therefore, the hinge arm 36 and the protruding block 341 move relative to each other. When the hinge arm 36 pushes the protruding block 341, the stop member 34 retracts into the guide slot 321 toward the resilient member 38. When the protruding block 341 pushes the hinge arm 36, the stop member 34 extends out of the guide slot 321 spaced from the resilient member 38. Extension of the stop member 34 out of the guide slot 321 is limited by the limiting pin 365. In at least one embodiment, the hinge arm 36 pushes the protruding block 341 by the driving member 20, and the protruding block 341 pushes the hinge arm 36 by a restoring force of the resilient member 38.

Figure 2:
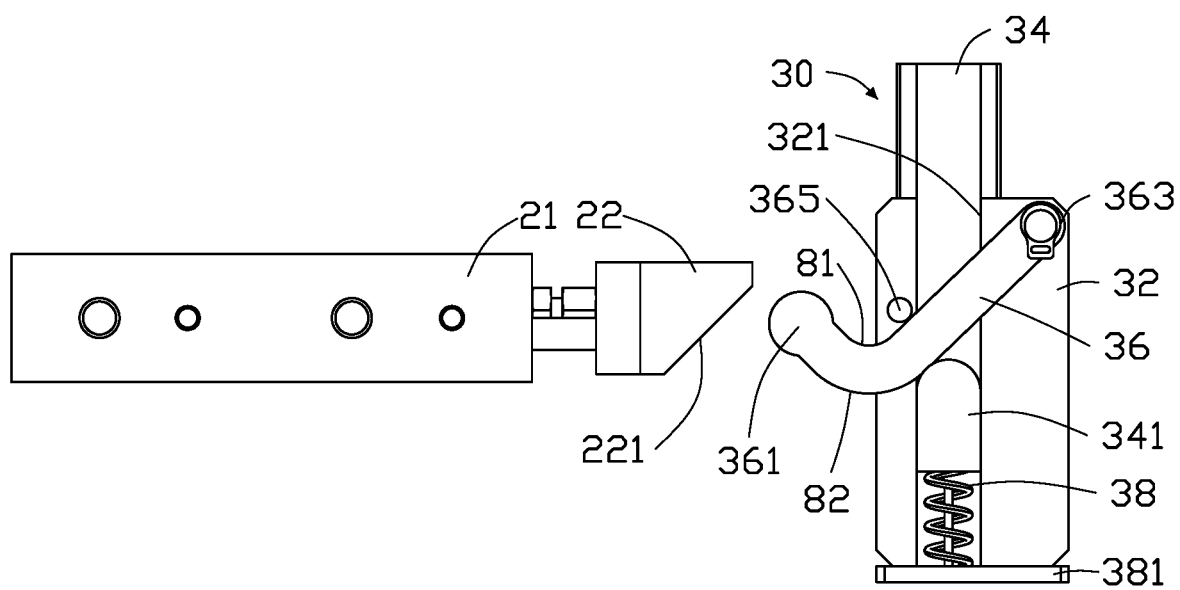
FIG. 2 is a cross-sectional view of the unpowered stop mechanism in FIG. 1 showing a stop member being pushed out of a guide member.

Referring to FIG. 2, the stop member 34 extends out from the guide slot 321 by the resilient member 38, and the driving member 20 does not yet drive the stop assembly 30. In detail, the restoring force of the resilient member 38 pushes the stop member 34 within the guide slot 321. The protruding block 341 of the stop member 34 protrudes from the outer surface of the guide member 32 and pushes the hinge arm 36, and the protruding block 341 abuts on the second edge 82 of the hinge arm 36 and pushes toward the upper portion of the guide slot 321 receiving the stop member 34, thereby causing the stop member 34 to protrude out of the guide slot 321. Extension of the stop member out of the guide slot 321 is limited by the limiting pin 365. The limiting pin 365 protrudes from the outer surface of the guide member 32 and is located at the first edge 81 of the hinge arm 36. The limiting pin 365 is located at a side of the guide slot 321 opposite to the hinge end 363. Thus, the protruding block 341 pushing on the second edge 82 of the hinge arm 36 causes the hinge arm 36 to pivot about the hinge end 363. The limiting pin 365 limits a pivoting movement of the hinge arm 36, thereby limiting extension of the stop member 34 out of the guide slot 321. Additionally, extension of the stop member 34 can be adjusted by adjusting a distance between the limiting pin 365 and the end of the guide slot 321 receiving the stop member 34. That is, as the distance between the limiting pin 365 and the end of the guide slot 321 receiving the stop member 34 is increased, the extension of the stop member 34 is decreased. As the distance between the limiting pin 365 and the end of the guide slot 321 receiving the stop member 34 is decreased, the extension of the stop member 34 is increased. In other words, as the limiting pin 365 is more adjacent to the end of the guide slot 321 receiving the stop member 34, the extension of the stop member 34 is increased.

Figure 3:
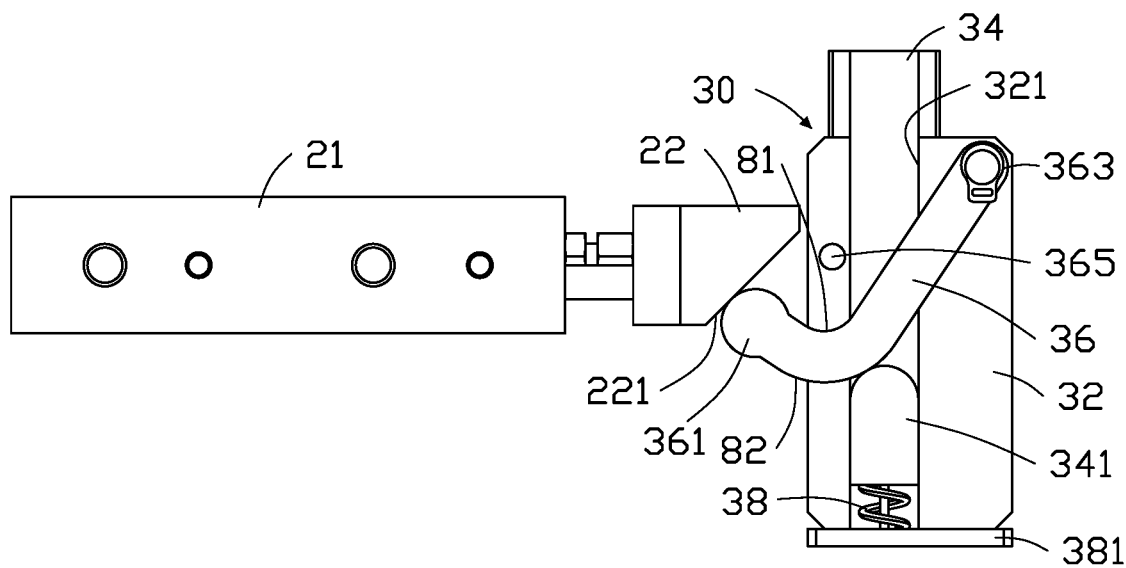
FIG. 3 is a cross-sectional view of the unpowered stop mechanism in FIG. 1 showing the stop member being retracted into the guide member.

Referring to FIG. 3, the stop member 34 retracts within the guide slot 321 by the driving member 20. In at least one embodiment, the driving member 20 includes a driving block 22 spaced from the protruding end 361 of the hinge arm 36. When the driving block 22 pushes the protruding end 361, the hinge arm 36 is driven to act on the stop member 34. In at least one embodiment, the driving block 22 includes an inclined surface 221, and the protruding end 361 is a curved end. The inclined surface applied on the curved end allows the driving member 20 to drive the hinge arm 36. In detail, the driving member 20 includes a driving mechanism 21, such as a pneumatic cylinder or an oil cylinder, for example. The driving block 22 is driven by the driving mechanism 21 to push the protruding end 361 of the hinge arm 36, thereby pivoting the hinge arm 36 about the hinge end 363. The second edge 82 of the hinge arm 36 pushes the protruding block 341 of the stop member 34 to drive the stop member 34 to retract within the guide slot 321. Additionally, the second edge 82 of the hinge arm 36 is a curved surface to allow the hinge arm 36 to smoothly push the protruding block 341. Furthermore, when the stop member 34 retracts within the guide slot 321, the resilient member 38 is compressed so that the stop member 34 is able to be pushed by the restoring force of the resilient member 38. Additionally, a retraction position of the stop member 34 is maintained by the driving member 20 driving the hinge arm 36 to push the protruding block 341. Therefore, a retraction distance of the stop member 34 can be adjusted by adjusting a pushing distance between the driving member 20 and the hinge arm 36. As the pushing distance between the driving member 20 and the hinge arm 36 is increased, the hinge arm 36 pushing the protruding block 341 causes the retraction distance of the stop member 34 to increase. As the pushing distance between the driving member 20 and the hinge arm 36 is decreased, the hinge arm 36 pushing the protruding block 341 causes the retraction distance of the stop member 34 to decrease. Therefore, the extension distance of the stop member 34 is adjusted by adjusting the position of the limiting pin 365, and the retraction distance of the stop member 34 is adjusted by adjusting the pushing distance between the driving member 20 and the hinge arm 36. Thus, extension and retraction of the stop member 34 is easily controlled.

Figure 4:
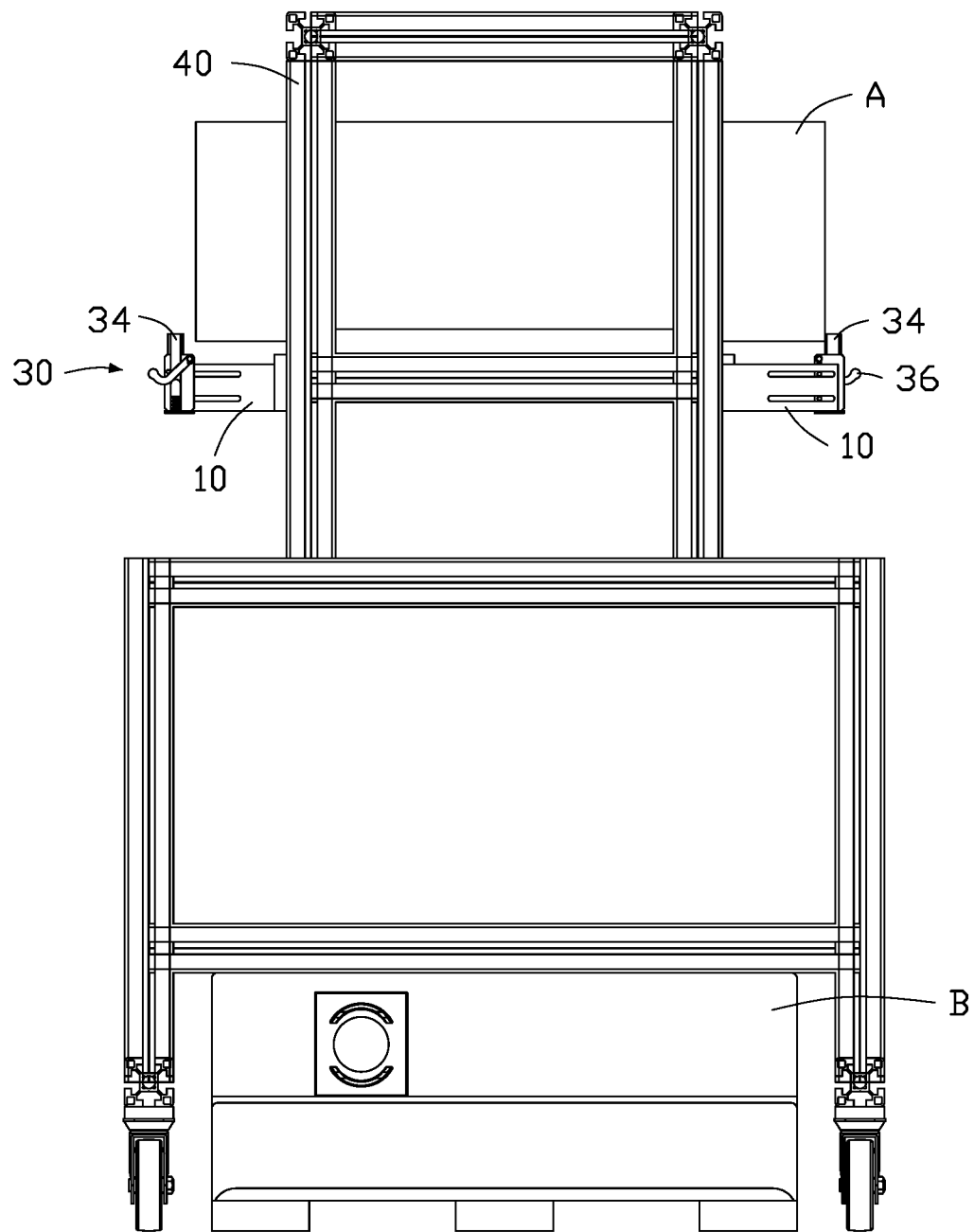
FIG. 4 is a diagram of a transport frame including the unpowered stop mechanism and being transported by an auto-guided vehicle.

Referring to FIG. 4, the mounting seat 10 includes a transport frame 40. The mounting seat 10 is located on a lateral side of the transport frame 40 so that the stop assembly 30 on the mounting seat 10 is on the lateral side of the transport frame 40 to stop a workpiece A carried on the transport frame 40. The driving member 20 (shown in FIG. 2) is outside of the transport frame and spaced from the stop assembly 30. When the transport frame 40 is moved away from the driving member 20, the stop member 34 is positioned to stop the workpiece A carried on the transport frame 40. When the stop assembly 30 of the transport frame 40 is operated on by the driving member 20, the stop member 34 is not in position to stop the workpiece A carried on the transport frame 40. In at least one embodiment, the transport frame 40 is installed on an auto-guided vehicle (AGV) B. The transport frame 40 moves along with the AGV B to transport the workpiece A. The workpiece A moved along with the AGV B needs to be secured in place. When the workpiece A is arrived at a transport position, the workpiece A needs to be conveniently removed from the transport frame 40. Thus, the mounting seat 10 located on the lateral side of the transport frame 40 prevents the workpiece A from falling off the transport frame 40 by the stop member 34 of the stop assembly 30 on the lateral side of the transport frame 40. The driving member 20 is located at the transport position (not shown) of the workpiece A so that when the transport frame 40 arrives at the transport position, the hinge arm 36 of the stop assembly 30 is operated on by the driving member 20 (shown in FIG. 3) to drive the stop member 34 to retract to the retraction position. That is, the stop member 34 does not stop the workpiece A so that the workpiece A is conveniently transported.

The stop member 34 only requires an external force driven by the driving member 20 operating on the stop assembly 30 to not be in a stopping position. Thus, a workpiece is held securely in place by the unpowered stop mechanism 100.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An unpowered stop mechanism comprising:
a mounting seat;
a driving member; and
a stop assembly;
wherein the stop assembly is located on the mounting seat;
wherein the stop assembly is spaced from the driving member;
wherein the stop assembly comprises a guide member, a stop member, and a hinge arm;
wherein the stop member is received within a guide slot defined in the guide member;
wherein the hinge arm is pivotably coupled to the guide member;
wherein the hinge arm protrudes from the guide member and is spaced from the driving member;
wherein when the driving member is moved to abut on the hinge arm, the driving member drives the hinge arm to drive the stop member to retract within the guide slot; and
wherein when the driving member is moved to be spaced from the hinge arm, the stop member is driven by a resilient member received within the guide slot to protrude out of the guide slot.

2. The unpowered stop mechanism of claim 1, wherein the mounting seat comprises a mounting end; the stop assembly is located at an end of the mounting seat opposite to the mounting end; the stop assembly is oriented perpendicularly to the mounting seat to orient the stop member of the stop assembly on a lateral side of the mounting seat; the hinge arm comprises a protruding end protruding from the end of the mounting seat opposite to the mounting end; the protruding end is spaced from the driving member.

3. The unpowered stop mechanism of claim 1, wherein the guide slot and the hinge arm are located on an outer surface of the guide member; an upper portion of the guide slot receives the stop member, and a lower portion of the guide slot receives the resilient member; the resilient member resists against the stop member; the hinge arm spans across the guide slot.

4. The unpowered stop mechanism of claim 3, wherein a base plate is located at a bottom end of the guide slot to cause the stop member resisted against by the resilient member to protrude out of a top end of the guide slot.

5. The unpowered stop mechanism of claim 3, wherein the guide slot is a dovetail slot; the stop member is a sliding block slidably received within the guide slot; the stop member comprises a protruding block located at a bottom end of the guide slot; the protruding block protrudes from a surface of the stop member and abuts on the hinge arm.

6. The unpowered stop mechanism of claim 5, wherein the hinge arm comprises a hinge end pivotably coupled at an end of the guide slot receiving the stop member; the hinge arm further comprises a first edge and a second edge opposite to the first edge, the second edge of the hinge arm abuts on the protruding block; a limiting pin protruding from an outer surface of the guide member is located at the first edge of the hinge arm; the limiting pin is located at an end of the guide slot spaced from the hinge end; the limiting pin limits movement of the hinge arm.

7. The unpowered stop mechanism of claim 6, wherein the hinge arm and the protruding block move relative to each other; when the hinge arm pushes the protruding block, the stop member retracts into the guide slot; when the protruding block pushes the hinge arm, the stop member extends out of the guide slot; extension of the stop member out of the guide slot is limited by the limiting pin.

8. The unpowered stop mechanism of claim 2, wherein the driving member comprises a driving mechanism and a driving block spaced from the protruding end of the hinge arm; the driving block is driven by the driving mechanism to push the protruding end to cause the hinge arm to drive the stop member.

9. The unpowered stop mechanism of claim 8, wherein the driving block comprises an inclined surface; the protruding end is a curved end; the inclined surface applied on the curved end allows the driving member to drive the hinge arm.

10. The unpowered stop mechanism of claim 1, wherein the mounting seat comprises a transport frame; the mounting seat is located on a lateral side of the transport frame so that the stop mechanism on the mounting seat on the lateral side of the transport frame stops a workpiece carried on the transport frame; the driving member is outside of the transport frame and spaced from the stop assembly; when the transport frame is moved to be spaced from the driving member, the stop member is positioned to stop the workpiece carried on the transport frame; when the hinge arm of the stop assembly of the transport frame is moved to abut on the driving member, the stop member is not in position to stop the workpiece carried on the transport frame.

* * * * *